United States Patent [19]

Haberstroh

[11] 3,902,863

[45] Sept. 2, 1975

[54] METHOD OF MANUFACTURE OF COPPER PLATED LEAD SHEET MATERIALS

[76] Inventor: Günther Haberstroh, Falkensteiner Ufer 88, 2 Hamburg-Blankenese, Germany

[22] Filed: July 10, 1973

[21] Appl. No.: 378,027

[30] Foreign Application Priority Data

July 14, 1972 Germany............................ 2234646

[52] U.S. Cl................................... 29/183.5; 29/199

[51] Int. Cl............................................. B32b 15/20

[58] Field of Search............................ 29/199, 183.5

[56] References Cited

UNITED STATES PATENTS

| | | | |
|---|---|---|---|
| 1,304,844 | 5/1919 | Barnes | 29/199 |
| 1,537,731 | 5/1925 | Basch | 29/199 |
| 2,388,019 | 10/1945 | Strickland | 29/199 X |
| 2,465,329 | 3/1949 | Murray | 29/199 X |
| 3,345,145 | 10/1967 | Pijls | 29/199 X |
| 3,623,205 | 11/1971 | Scott | 29/199 X |

*Primary Examiner*—L. Dewayne Rutledge
*Assistant Examiner*—Arthur J. Steiner
*Attorney, Agent, or Firm*—Ernest F. Marmorek

[57] ABSTRACT

A copper coated lead sheet material in which the copper coating consists of a copper foil whereby the mutually facing surfaces of the copper foil and the lead sheet which are to be soldered are plated with a coating consisting of tin and lead, and a foil of soldering tin consisting of lead and tin is arranged between the lead sheet and the copper foil in thus forming a lead sheet material combining the properties of lead with those of copper.

2 Claims, 4 Drawing Figures

METHOD OF MANUFACTURE OF COPPER PLATED LEAD SHEET MATERIALS

DESCRIPTION OF THE INVENTION

The present invention relates to copper plated lead sheets and methods of manufacturing the same.

Lead sheets and copper sheets are semifinished materials having widespread usage particularly in the construction industry. Lead sheets are readily workable and find usage as a covering or lining material in widely varied forms such as for e.g. roof and gutter linings. Although lead has a high resistance against a large number of chemical substances it is, however, instable against fresh mortar so that in case there exists the risk of direct contact of the lead with fresh mortar the lead must be very carefully insulated. Copper on the other hand is resistant against alkaline substances and therefore likewise against mortar and cement. Since moreover the surfaces of copper sheets become oxydized by atmospheric influences and are thereby covered with an aesthetically appealing patina copper sheets are being used as a material for complete roof linings. The handicap of the more difficult workability of the copper as compared to lead had heretofore to be put up with.

It is an object of the present invention to provide a method of manufacture of novel semifinished materials.

It is another object of the invention to provide a method of manufacture of novel semifinished materials which combine desired properties of lead with those of copper.

It is a further object of the invention to provide a novel material having unique properties.

It is a still further object of the invention to provide a copper coated lead sheet material which combines desired properties of lead sheets with those of copper sheets.

In accordance with the present invention it is now proposed to apply a copper coating on one or both sides of a lead sheet, with or without the usage of bonding means.

In one embodiment of the inventive method the copper foil is plated onto the lead sheet whereas in another embodiment the copper foil may be soldered to the lead sheet in using an intermediate layer of soldering tin. The mutually facing surfaces of the copper foil and the lead sheet which are to be soldered are prior to soldering the copper foil onto the lead sheet preferably plated with an alloy consisting of 60 % tin and 40 % lead, and a soldering tin foil having a thickness in the range from 50 to 80 microns and consisting of 60 % tin and 40 % lead is inserted as an intermediate layer between the lead sheet and the copper foil.

The copper foil may also be bonded to the lead sheet with the aid of an organic or an inorganic adhesive.

According to another aspect of the inventive method the copper coating may be obtained by spraying finely divided copper onto the lead sheet. The finely divided copper may be sprayed onto the lead sheet after the finely divided soldering tin or an organic or an inorganic adhesive has been sprayed thereon or substantially simultaneously therewith. The finely divided copper may also be sprayed onto a molten surface layer of the lead sheet.

The copper coating may likewise be produced by galvanic coating of the lead sheet with copper. In this case the lead sheet is electrolytically coated with a metal such as tin or nickel, prior to applying the copper coating. The metal coating may be applied by plating, spraying or a galvanic technique.

In a modified embodiment, an intermediate coating of soldering tin, tin foil or the like including a suitable activated fluxing agent may be applied. Before applying the copper coating the metal coated lead sheet is degreased in a conventional manner.

The manufacturing method of the present invention allows to produce a lead sheet material in which the copper coating consists of a copper foil integrally connected to the lead sheet. The mutually facing contacting surfaces of the lead sheet and the copper foil may either be provided with a soldering tin coating and a soldering tin foil may additionally be arranged between the two coatings or the copper foil may be bonded to the lead sheet by means of an intermediate layer of an organic or inorganic adhesive.

The copper plated lead sheet material which may be produced in the above described manner combines desired properties of lead with those of copper. The material may be readily worked and soldered or deformed and exhibits substantially improved mechanical and corrosion resistant properties as compared to a pure lead sheet. Apart from the better appearance of copper due to the patina and the substantially improved working properties of the lead material as compared to copper another advantage is the substantially reduced material costs whereby the material may be put to the same technical uses and e.g. be used for roof coatings.

In the following, several illustrative embodiments of the novel copper plated lead sheet material will be described with reference to the appended drawing wherein FIG. 1 is a perspective view of a lead sheet unilaterally coated with a copper foil;

Figure 1:
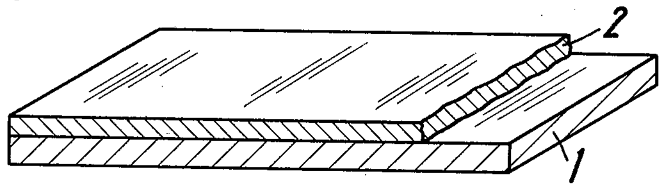
Figure 2:
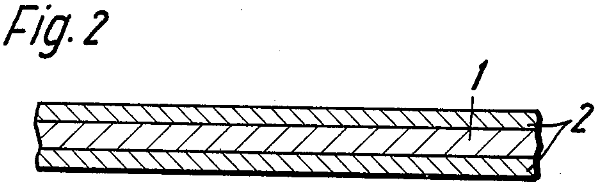
FIG. 2 is a vertical cross-sectional view of a lead sheet bilaterally coated with a copper foil.

Referring to FIGS. 1 and 2, the basic structure of an unilaterally or respectively bilaterally copper plated lead sheet is shown in which the lead sheet is indicated by the reference numeral 1 and the one or respectively two copper foils is or respectively are indicated by the reference numerals 2.

Figure 3:
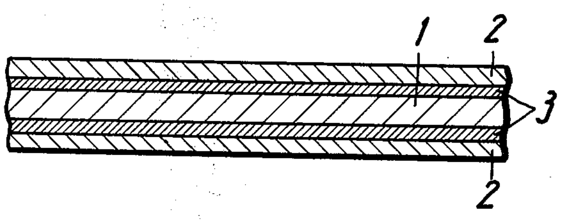
FIG. 3 is a vertical cross-sectional view of a lead sheet bilaterally bonded to copper foils.

FIG. 3 shows a lead sheet 1 that is on both sides bonded to a copper foil 2 by means of an organic or an inorganic adhesive 3. The adhesive 3 may for example consist of water glass.

Instead of using a copper foil, finely divided copper in powder form may be sprayed onto the lead sheet by means of a conventional metal spray gun whereby the adhesive may be sprayed onto the lead sheet prior to or substantially simultaneously with the copper. If the lead sheet surface is conditioned in a suitable manner such as by melting a surface layer of the lead sheet which is to be coated with copper the copper may also be applied by means of a high pressure metal spraying device.

Figure 4:
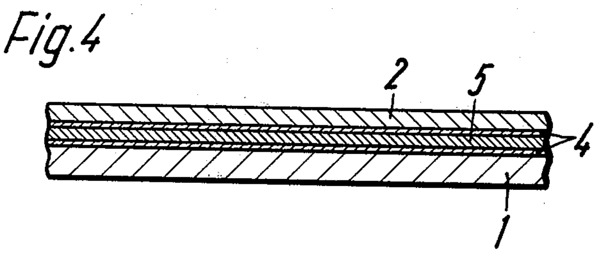
FIG. 4 is a vertical cross-sectional view of an unilaterally copper coated lead sheet in which the soldering surfaces of the lead sheet and of the copper foil are each provided with a tin lead plating and a soldering tin foil is arranged between the mutually bonded surfaces.

FIG. 4 shows a lead sheet 1 and a copper foil 2 having both at their mutually facing surfaces a tin lead plating 4 and wherein a soldering tin foil 5 is interposed between the platings 4. For plating, preferably a tin lead alloy consisting of 60 % tin and 40 % lead is used. The soldering tin foil 5 preferably consists of the same alloy and has a thickness in the range from 50 to 80 microns. After passing the laminate through a dryer such as a drying tunnel or a drying trum in which the internal temperature is above the melting temperature of the soldering tin an integral metal material is obtained.

In another interesting modification of the inventive method the copper foil is hot-sealed onto a lead sheet coated with polyethylene by applying heat to melt a surface layer of the polyethylene coating. In this case the copper foil is applied by means of the well known heat sealing process. To provide the copper foil with heat sealing properties, it may be coated at least unilaterally, prior to hot-sealing, with a polyethylene copolymer.

What is claimed is:

1. A copper coated lead sheet material produced by connecting a copper coating to at least one side of a lead sheet, said copper coated lead sheet material characterized in that the copper coating consists of a copper foil integrally connected to the lead sheet, said copper foil being thinner than said lead sheet and the surfaces of said copper foil and said lead sheet facing each other each being plated with an alloy of 60% by weight tin and 40% by weight lead and are separated by a solder tin foil of said alloy having a thickness of about 50 to 80 microns.

2. The copper plated lead sheet as claimed in claim 1, wherein said copper foil and said lead sheet are soldered together.

* * * * *